United States Patent
Tyler et al.

(10) Patent No.: US 10,953,598 B2
(45) Date of Patent: Mar. 23, 2021

(54) ADDITIVE MANUFACTURING SYSTEM HAVING VIBRATING NOZZLE

(71) Applicant: CC3D LLC, Coeur d'Alene, ID (US)

(72) Inventors: Kenneth Lyle Tyler, Coeur d'Alene, ID (US); Trevor David Budge, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 808 days.

(21) Appl. No.: 15/618,066

(22) Filed: Jun. 8, 2017

(65) Prior Publication Data

US 2018/0126665 A1    May 10, 2018

Related U.S. Application Data

(60) Provisional application No. 62/417,709, filed on Nov. 4, 2016.

(51) Int. Cl.
 *B29C 69/00* (2006.01)
 *B29C 64/209* (2017.01)
 (Continued)

(52) U.S. Cl.
 CPC .......... *B29C 64/209* (2017.08); *B29C 64/106* (2017.08); *B29C 64/118* (2017.08); *B29C 64/141* (2017.08); *B29C 64/165* (2017.08); *B29C 64/20* (2017.08); *B29C 64/227* (2017.08); *B29C 64/245* (2017.08); *B29C 64/264* (2017.08); *B29C 64/291* (2017.08); *B29C 64/307* (2017.08); *B29C 64/336* (2017.08); *B29C 64/379* (2017.08);
 (Continued)

(58) Field of Classification Search
 CPC ......... B33Y 10/00; B33Y 30/00; B33Y 50/00; B33Y 50/02
 See application file for complete search history.

(56) References Cited

U.S. PATENT DOCUMENTS 3,286,305 A    11/1966    Seckel
3,809,514 A     5/1974    Nunez
(Continued)

FOREIGN PATENT DOCUMENTS

DE    4102257 A1    7/1992
EP    2589481 B1    1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Ryan M Ochylski
(74) *Attorney, Agent, or Firm* — Ryan C. Stockett

(57) ABSTRACT

A system is disclosed for use in additively manufacturing a composite structure. The system may include a nozzle configured to discharge a composite material, including a matrix and a continuous reinforcement. The system may also include a support configured to move the nozzle in multiple dimensions during discharge of the composite material, and a vibration mechanism configured to generate oscillations within the nozzle during discharge.

17 Claims, 4 Drawing Sheets

(51) Int. Cl.

| | |
|---|---|
| *B33Y 30/00* | (2015.01) |
| *B33Y 50/02* | (2015.01) |
| *B33Y 40/00* | (2020.01) |
| *B29C 64/118* | (2017.01) |
| *B29C 64/386* | (2017.01) |
| *B29C 64/20* | (2017.01) |
| *B29C 64/393* | (2017.01) |
| *B29C 64/106* | (2017.01) |
| *B29C 70/38* | (2006.01) |
| *B29C 64/291* | (2017.01) |
| *B29C 64/245* | (2017.01) |
| *B29C 64/141* | (2017.01) |
| *B29C 64/264* | (2017.01) |
| *B29C 64/307* | (2017.01) |
| *B29C 64/379* | (2017.01) |
| *B29C 64/336* | (2017.01) |
| *B29C 64/165* | (2017.01) |
| *B29C 64/227* | (2017.01) |
| *B29C 64/40* | (2017.01) |
| *B33Y 10/00* | (2015.01) |
| *B29C 35/08* | (2006.01) |
| *B29C 35/02* | (2006.01) |
| *B29K 105/08* | (2006.01) |
| *B29B 15/12* | (2006.01) |
| *B29C 70/52* | (2006.01) |
| *B29C 31/04* | (2006.01) |
| *B29C 64/259* | (2017.01) |
| *B33Y 70/00* | (2020.01) |
| *B29C 64/295* | (2017.01) |

(52) U.S. Cl.
CPC .......... *B29C 64/386* (2017.08); *B29C 64/393* (2017.08); *B29C 64/40* (2017.08); *B29C 70/384* (2013.01); *B33Y 30/00* (2014.12); *B33Y 40/00* (2014.12); *B33Y 50/02* (2014.12); *B29B 15/122* (2013.01); *B29C 31/042* (2013.01); *B29C 35/0261* (2013.01); *B29C 64/259* (2017.08); *B29C 64/295* (2017.08); *B29C 70/524* (2013.01); *B29C 2035/0827* (2013.01); *B29C 2035/0855* (2013.01); *B29K 2105/08* (2013.01); *B33Y 10/00* (2014.12); *B33Y 70/00* (2014.12)

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,121,329 A | 6/1992 | Crump | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,803,003 B2 | 10/2004 | Rigali et al. | |
| 6,934,600 B2 | 8/2005 | Jang et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0242208 A1 | 8/2014 | Elsworthy | |
| 2014/0252668 A1* | 9/2014 | Austin | B28B 3/20 264/40.7 |
| 2014/0268604 A1 | 9/2014 | Wicker et al. | |
| 2014/0291886 A1 | 10/2014 | Mark et al. | |
| 2015/0174824 A1 | 1/2015 | Lee et al. | |
| 2015/0136455 A1 | 5/2015 | Fleming | |
| 2015/0165691 A1 | 6/2015 | Mark et al. | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |

(56) References Cited

U.S. PATENT DOCUMENTS

| | | |
|---|---|---|
| 2016/0288420 A1 | 10/2016 | Anderson et al. |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G, Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Oct. 13, 2016 for PCT/US2016/042906 to CC3D LLC Filed Jul. 19, 2016.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

(56) References Cited

OTHER PUBLICATIONS

International Search Report dated Nov. 2, 2017 for PC/US2017/046316 to CC3D LLC Filed Aug. 10, 2017.

\* cited by examiner

ADDITIVE MANUFACTURING SYSTEM HAVING VIBRATING NOZZLE

RELATED APPLICATIONS

This application is based on and claims the benefit of priority from U.S. Provisional Application No. 62/417,709 that was filed on Nov. 4, 2016, the contents of all of which are expressly incorporated herein by reference.

TECHNICAL FIELD

The present disclosure relates generally to a manufacturing system and, more particularly, to an additive manufacturing system having a vibrating nozzle.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) required for some applications. In addition, conventional pultrusion techniques may suffer from poor fiber-to-fiber adhesion, poor fiber impregnation, bubble inclusion, and other related problems.

The disclosed system is directed to addressing one or more of the problems set forth above and/or other problems of the prior art.

SUMMARY

In one aspect, the present disclosure is directed to an additive manufacturing system. The additive manufacturing system may include a nozzle configured to discharge a composite material, including a matrix and a continuous reinforcement. The additive manufacturing system may also include a support configured to move the nozzle in multiple dimensions during discharge of the composite material, and a vibration mechanism configured to generate oscillations within the nozzle during discharge.

In another aspect, the present disclosure is directed to another additive manufacturing system. This additive manufacturing system may include a nozzle configured to discharge a composite material, including a matrix and a continuous reinforcement. The additive manufacturing system may also include a support configured to move the nozzle in multiple dimensions during discharging, and a cure enhancer configured to direct energy to the composite material during discharging to enhance curing of the matrix. The additive manufacturing system may further include a shoe connected to the nozzle at a trailing side relative to a travel direction of the nozzle, a first spring configured to bias the shoe against the composite material discharging from the nozzle, and a first actuator configured to generate oscillations in the shoe in an axial direction of the nozzle. The additive manufacturing system may additionally include a blade connected to the nozzle at a leading side, a second spring configured to bias the blade in the axial direction of the nozzle, and a second actuator configured to generate oscillations in the blade in a direction normal to the axial direction of the nozzle.

In yet another aspect, the present disclosure is directed to a head for an additive manufacturing system. The head may include a reservoir configured to contain a matrix, and a nozzle configured to receive the matrix from the reservoir and to discharge a composite material including the matrix and a continuous reinforcement. The head may also include at least one vibration mechanism connected to the nozzle and configured to generate oscillations in an axial direction of the nozzle.

DETAILED DESCRIPTION

Figure 1:
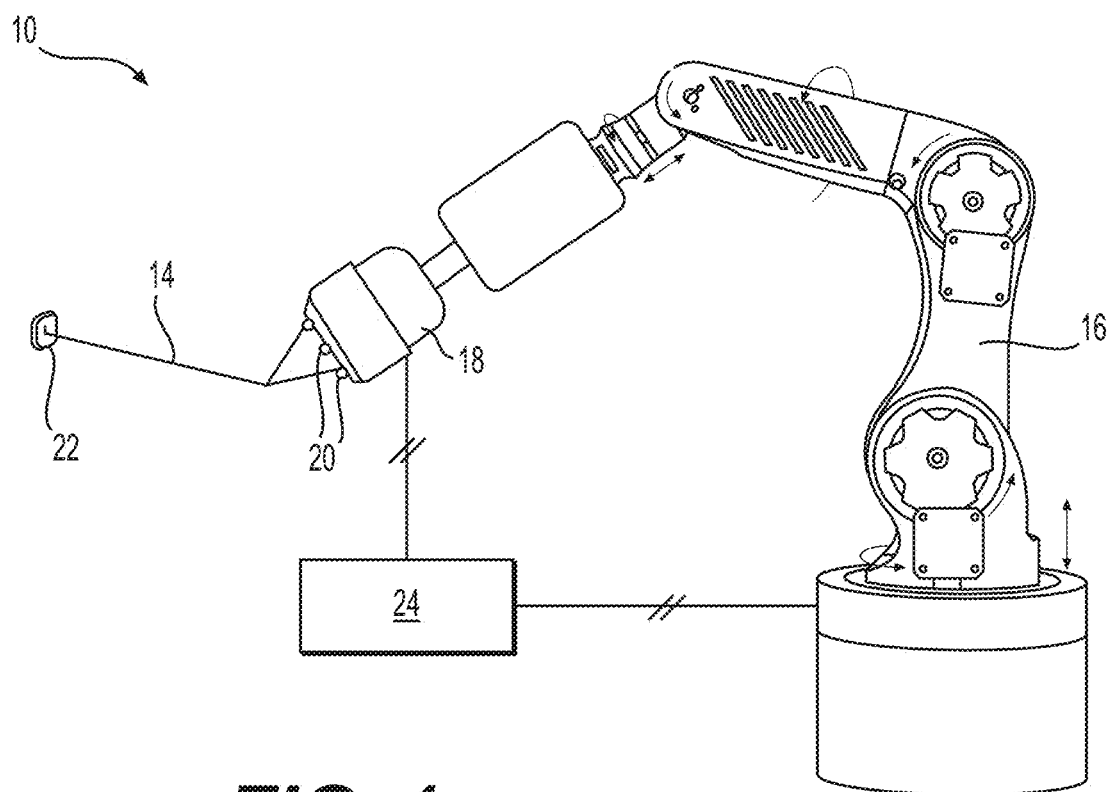
FIGS. 1 and 2 are diagrammatic illustrations of exemplary disclosed manufacturing systems.
Figure 2:
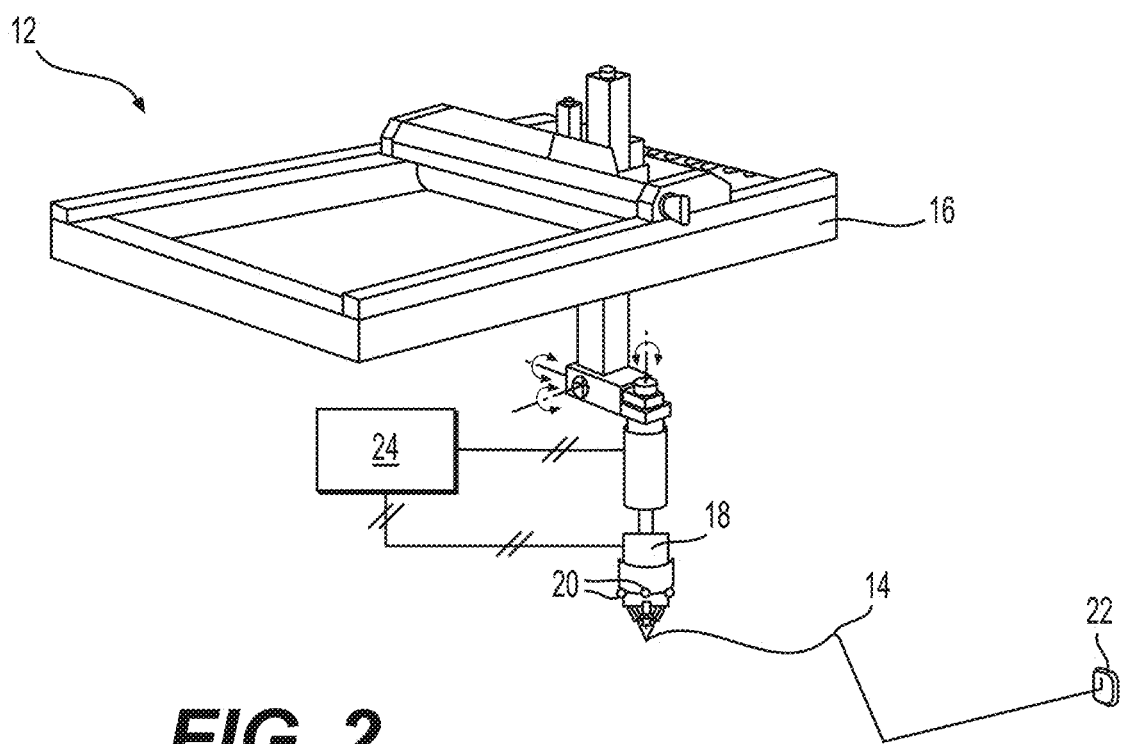

FIGS. 1 and 2 illustrate different exemplary systems 10 and 12, which may be used to continuously manufacture composite structures 14 having any desired cross-sectional shape (e.g., circular, polygonal, etc.). Each of systems 10, 12 may include at least a support 16 and a head 18. Head 18 may be coupled to and moved by support 16. In the disclosed embodiment of FIG. 1, support 16 is a robotic arm capable of moving head 18 in multiple directions during fabrication of structure 14, such that a resulting longitudinal axis of structure 14 is three-dimensional. In the embodiment of FIG. 2, support 16 is an overhead gantry also capable of moving head 18 in multiple directions during fabrication of structure 14. Although supports 16 of both embodiments are shown as being capable of 6-axis movements, it is contemplated that any other type of support 16 capable of moving head 18 in the same or in a different manner could also be utilized, if desired. In some embodiments, a drive may mechanically couple head 18 to support 16, and may include components that cooperate to move and/or supply power or materials to head 18.

Head 18 may be configured to receive or otherwise contain a matrix material. The matrix material may include any type of matrix material (e.g., a liquid resin, such as a zero volatile organic compound resin; a powdered metal;

etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 18 may be pressurized, for example by an external device (e.g., an extruder or another type of pump—not shown) that is fluidly connected to head 18 via a corresponding conduit (not shown). In another embodiment, however, the pressure may be generated completely inside of head 18 by a similar type of device. In yet other embodiments, the matrix material may be gravity-fed through and/or mixed within head 18. In some instances, the matrix material inside head 18 may need to be kept cool and/or dark to inhibit premature curing; while in other instances, the matrix material may need to be kept warm for the same reason. In either situation, head 18 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 14. The reinforcements may be stored within (e.g., on separate internal spools—not shown) or otherwise passed through head 18 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from head 18.

The reinforcements may be exposed to (e.g., coated with) the matrix material while the reinforcements are inside head 18, while the reinforcements are being passed to head 18, and/or while the reinforcements are discharging from head 18, as desired. The matrix material, dry reinforcements, and/or reinforcements that are already exposed to the matrix material (e.g., wetted reinforcements) may be transported into head 18 in any manner apparent to one skilled in the art.

One or more cure enhancers (e.g., a UV light, an ultrasonic emitter, a laser, a heater, a catalyst dispenser, etc.) 20 may be mounted proximate (e.g., within or on) head 18 and configured to enhance a cure rate and/or quality of the matrix material as it is discharged from head 18. Cure enhancer 20 may be controlled to selectively expose surfaces of structure 14 to energy (e.g., UV light, electromagnetic radiation, vibrations, heat, a chemical catalyst or hardener, etc.) during the formation of structure 14. The energy may increase a rate of chemical reaction occurring within the matrix material, sinter the material, harden the material, or otherwise cause the material to cure as it discharges from head 18. In the depicted embodiments, cure enhancer 20 includes multiple LEDs (e.g., 6 different LEDs) that are equally distributed about a center axis of head 18. However, it is contemplated that any number of LEDs or other energy sources could alternatively be utilized for the disclosed purposes and/or arranged in another manner (e.g., unequally distributed, arranged in a row, etc.). For example, the primary and/or auxiliary cure enhancers 20 could be located on an arm (not shown) that trails behind head 18, if desired. The amount of energy produced by cure enhancer 20 may be sufficient to cure the matrix material before structure 14 axially grows more than a predetermined length away from head 18. In one embodiment, structure 14 is completely cured before the axial growth length becomes equal to an external diameter of the matrix-coated reinforcement.

The matrix material and reinforcement may be discharged from head 18 via at least two different modes of operation. In a first mode of operation, the matrix material and reinforcement are extruded (e.g., pushed under pressure and/or mechanical force) from head 18, as head 18 is moved by support 16 to create the 3-dimensional shape of structure 14. In a second mode of operation, at least the reinforcement is pulled from head 18, such that a tensile stress is created in the reinforcement during discharge. In this mode of operation, the matrix material may cling to the reinforcement and thereby also be pulled from head 18 along with the reinforcement, and/or the matrix material may be discharged from head 18 under pressure along with the pulled reinforcement. In the second mode of operation, where the matrix material is being pulled from head 18, the resulting tension in the reinforcement may increase a strength of structure 14, while also allowing for a greater length of unsupported material to have a straighter trajectory (i.e., the tension may act against the force of gravity to provide free-standing support for structure 14).

The reinforcement may be pulled from head 18 as a result of head 18 moving away from an anchor point 22. In particular, at the start of structure-formation, a length of matrix-impregnated reinforcement may be pulled and/or pushed from head 18, deposited onto an anchor point 22, and cured, such that the discharged material adheres to anchor point 22. Thereafter, head 18 may be moved away from anchor point 22, and the relative movement may cause the reinforcement to be pulled from head 18. It should be noted that the movement of reinforcement through head 18 could be assisted (e.g., via internal feed mechanisms), if desired. However, the discharge rate of reinforcement from head 18 may primarily be the result of relative movement between head 18 and anchor point 22, such that tension is created within the reinforcement. It is contemplated that anchor point 22 could be moved away from head 18 instead of or in addition to head 18 being moved away from anchor point 22.

A controller 24 may be provided and communicatively coupled with support 16, head 18, and any number and type of cure enhancers 20. Controller 24 may embody a single processor or multiple processors that include a means for controlling an operation of system(s) 10 and/or 12. Controller 24 may include one or more general- or special-purpose processors or microprocessors. Controller 24 may further include or be associated with a memory for storing data such as, for example, design limits, performance characteristics, operational instructions, matrix characteristics, reinforcement characteristics, characteristics of structure 14, and corresponding parameters of each component of system(s) 10 and/or 12. Various other known circuits may be associated with controller 24, including power supply circuitry, signal-conditioning circuitry, solenoid/motor driver circuitry, communication circuitry, and other appropriate circuitry. Moreover, controller 24 may be capable of communicating with other components of system(s) 10 and/or 12 via wired and/or wireless transmission.

One or more maps may be stored in the memory of controller 24 and used during fabrication of structure 14. Each of these maps may include a collection of data in the form of lookup tables, graphs, and/or equations. In the disclosed embodiment, the maps are used by controller 24 to determine desired characteristics of cure enhancers 20, the associated matrix, and/or the associated reinforcements at different locations within structure 14. The characteristics may include, among others, a type, quantity, and/or configuration of reinforcement and/or matrix to be discharged at a particular location within structure 14, and/or an amount and/or location of curing. Controller 24 may then correlate operation of support 16 (e.g., the location and/or orientation of head 18) and/or the discharge of material from head 18 (a type of material, desired performance of the material, cross-linking requirements of the material, a discharge rate, etc.) with the operation of cure enhancers 20 such that structure 14 is produced in a desired manner.

Figure 3:
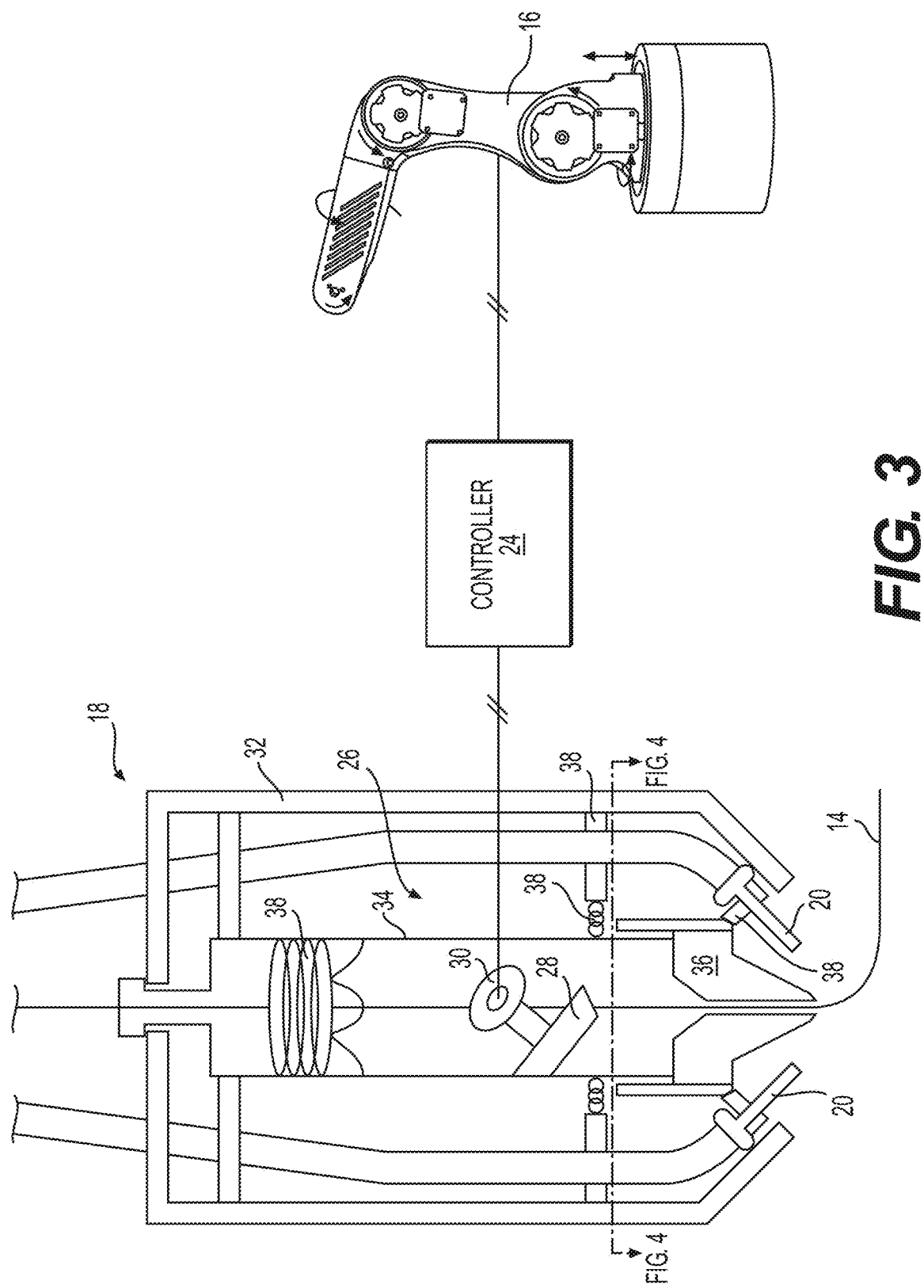
FIGS. 3-5 are diagrammatic illustrations of exemplary disclosed heads that may be used in conjunction with the manufacturing systems of FIGS. 1 and 2.
Figure 4:
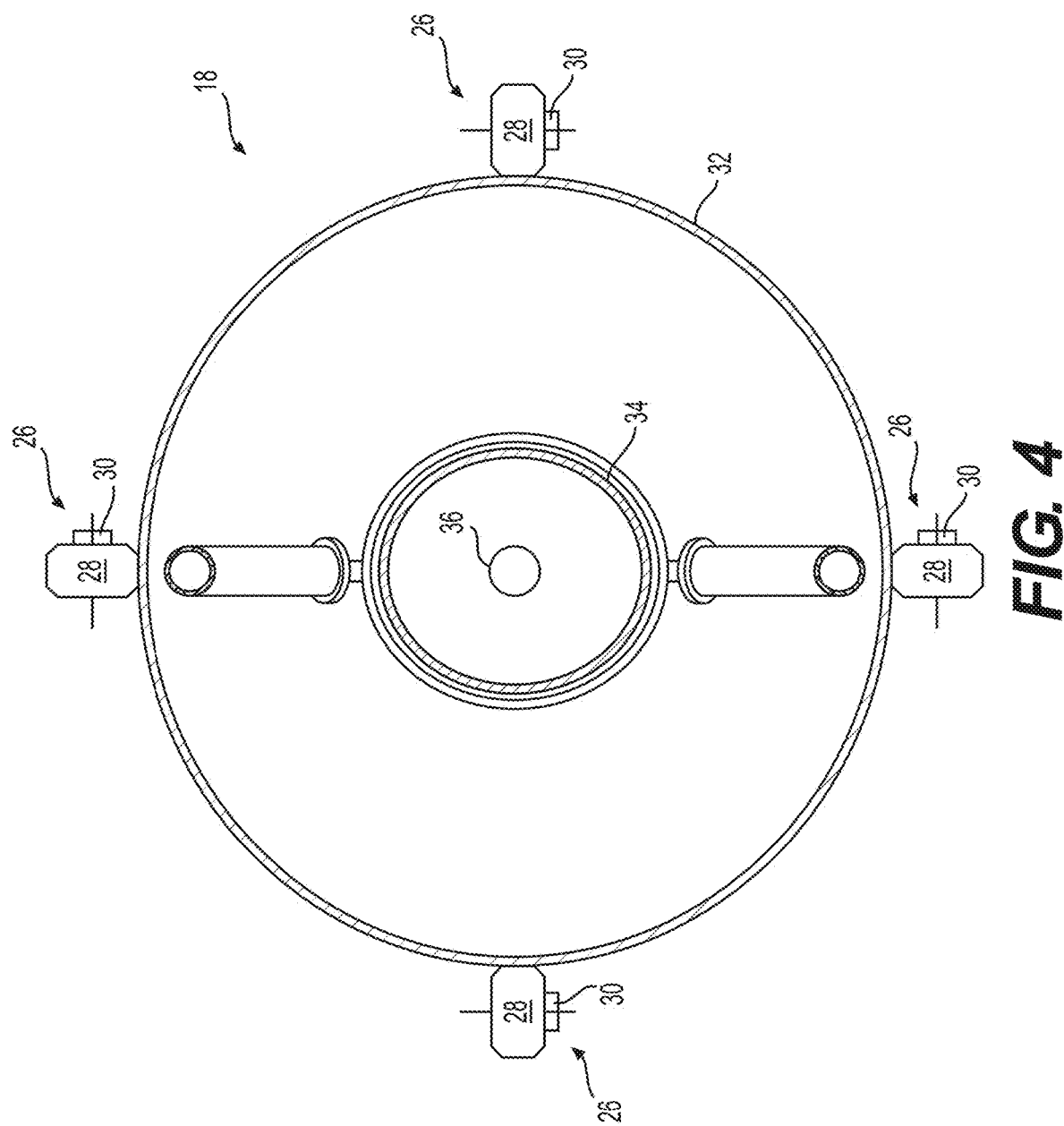

As shown in FIGS. 3 and 4, controller 24 may also be communicatively coupled with one or more vibration mechanisms 26 that are operatively attached to head 18. Controller 24 may be configured to selectively energize mechanism(s) 26 and thereby generate vibrations in the path of material discharging through head 18. These vibrations may improve fiber-to-fiber adhesion by forcing adjacent fibers against each other and/or against existing surfaces of structure 14; help to maintain a nozzle portion of head 18 clear of castoff matrix; enhance fiber impregnation as reinforcements travel through frequency-effected matrix; improve outgassing of bubbles from the matrix; and improve settling of the matrix into grooves and voids in structure 14. All of these things may enhance a strength and/or quality of structure 14.

Vibration mechanism 26 may include, among other things, a mass (e.g., an eccentric or balanced mass) 28 that is rotationally driven by a motor (e.g., a variable frequency motor) 30 in response to commands from controller 24. Mass 28 may be rotationally connected to a housing 32 of head 18, to a matrix reservoir 34, to a nozzle 36, and/or to another suitable component of head 18. The rotation of mass 28 may result in a corresponding agitation of head 18.

It is contemplated that vibration mechanism 26 could embody another type of device. For example, vibration mechanism 26 could embody an auditory vibration mechanism (e.g., a variable-frequency speaker). In this embodiment, controller 24 may selectively excite vibration mechanism 26 to variable frequencies and thereby generate the vibrations described above.

In some embodiments, it may be desirable to at least partially isolate portions of head 18 from vibrations induced by mechanism 26 (e.g., to extend a life of these components and/or to maintain a desired level of stability or position control). For this reason, one or more dampeners (e.g., springs, dashpots, elastomeric stoppers, etc.) 38 may be disposed within head 18 (e.g., within resin reservoir 34, between resin reservoir 34 and cure enhancer(s) 20, between resin reservoir 34 and support 16, between cure enhancer(s) 20 and housing 32, etc.).

FIG. 4 illustrates an exemplary arrangement of head 18 that includes multiple vibration mechanisms 26. In this arrangement, mechanisms 26 may at least partially surround nozzle 36 (e.g., in a substantially equally-distributed manner). For example, four different mechanisms 26 are shown as being located about 90° apart. In this arrangement, particular mechanisms 26 may be simultaneously energized by controller 24 to cooperatively cause corresponding movements of nozzle 36. For example, opposing mechanisms 26 (e.g., mechanisms located on opposite sides of nozzle 36) or adjacent mechanisms 26 (e.g., mechanisms located on the same side of nozzle 36) could be cooperatively energized to rotate in the same directions and/or at the same or different speeds, or in opposing directions to thereby cause nozzle 36 to vibrate up-and-down, to shift side-to-side, to move primarily in one direction (e.g., toward previously laid down fibers), etc. In addition, the frequencies of individual mechanisms 26 may be selectively adjusted to produce different movements of nozzle 36 (e.g., hops, jumps, zigzags, etc.).

Figure 5:
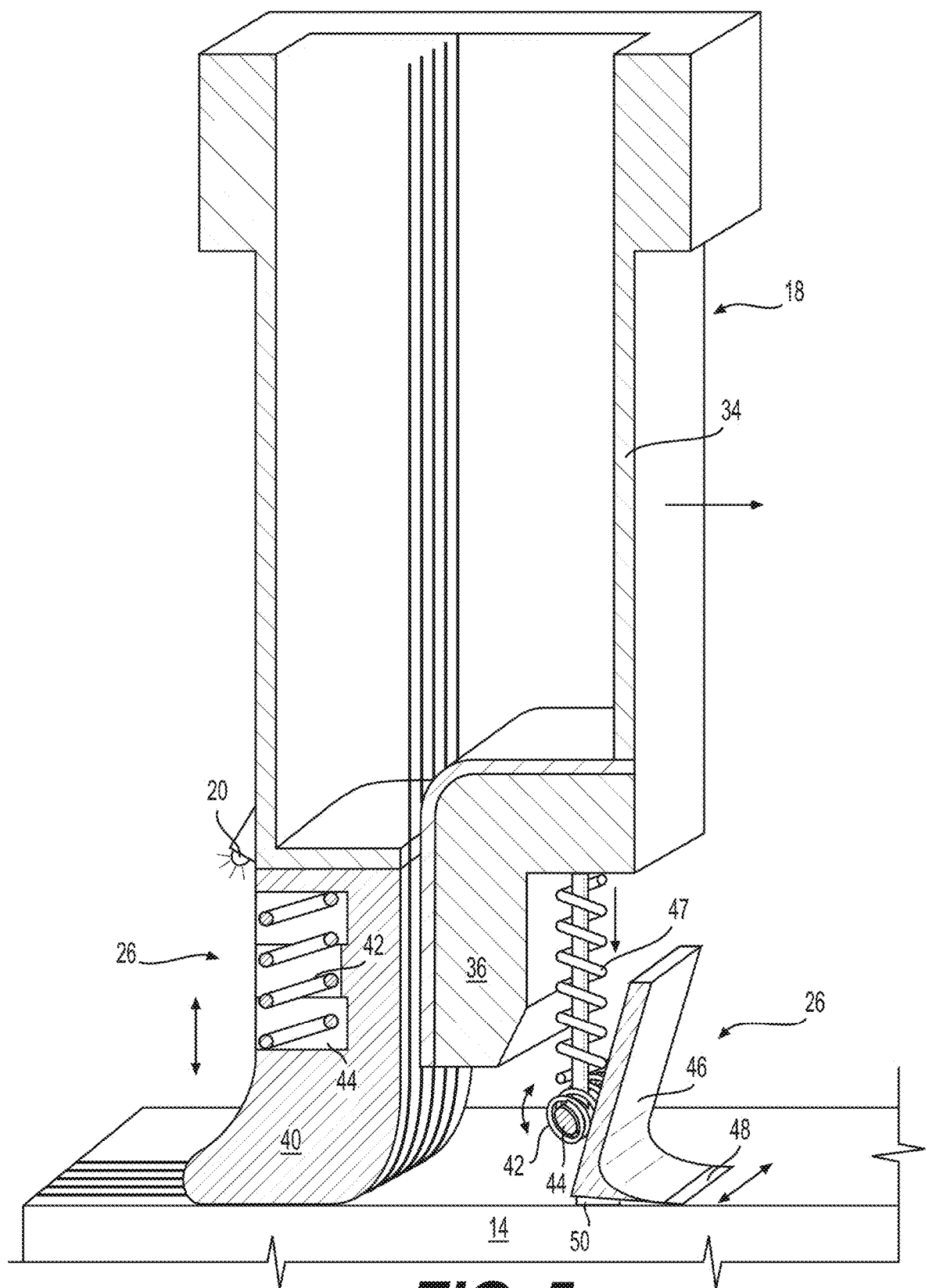

FIG. 5 illustrates another exemplary embodiment of head 18. In this embodiment, nozzle 36 is configured to discharge a ribbon of composite material, including a plurality of continuous matrix-coated reinforcements arranged in a line adjacent each other. At least one vibration mechanism 26 may be connected to head 18 (e.g., at a trailing side of nozzle 36) and configured to ride over and compact the discharging ribbon. In this embodiment, vibration mechanism 26 includes a shoe 40 that is biased (e.g., via a spring 42) downward onto the discharging ribbon, and a vibration actuator (e.g., a linear resonant actuator) 44 that generates oscillations of shoe 40 in a direction normal to a trajectory of the ribbon (e.g., in an axial direction of nozzle 36). In one embodiment, a frequency of the oscillations generated with shoe 40 may be in the ultrasonic range (e.g., at least 20,000 Hz). Although shoe 40 is shown as having a generally flat bottom surface, with a curved leading edge that reduces breakage of the reinforcements, it is contemplated that shoe 40 could have another shape that produces a non-planar ribbon, if desired (e.g., shoe 40 could function as a die). It is also contemplated that head 18 of FIG. 5 could discharge a single track, multiple separated tracks, and/or sheets of composite material, if desired.

It may be possible for the vibrating motion of shoe 40 to more complex, in some applications. For example, in addition to oscillating in the axial direction of nozzle 36, actuator 44 could induce oscillations having a circular component. The combined downward and circular oscillations may encourage a spiraling flow of matrix through nozzle 36 that is more efficient and/or faster.

In one embodiment, an additional vibration mechanism 26 may be located at a leading side of nozzle 36. This vibration mechanism 26 may be configured to prepare an exposed surface of structure 14 for deposition of the ribbon discussed above. For example, the leading vibration mechanism 26 may include a blade or arm 46 that is biased (e.g., via a spring 47) downward onto the exposed surface of structure 14, and a vibration actuator 44 that generates oscillations of blade 46 in a horizontal direction normal to the trajectory of the ensuing ribbon (i.e., in a side-to-side direction that is normal to the axial direction of nozzle 36). In one embodiment, a frequency of the oscillations generated with blade 46 may be much lower than the frequency of the oscillations in shoe 40 (e.g., at about 75 to 100 Hz). A leading edge 48 of blade 46 may be sharpened and/or include teeth used to cut away irregularities protruding from within the exposed surface of structure 14. It is contemplated that leading edge 48 could be oriented generally perpendicular relative to a travel direction of nozzle 36, or skewed such that any severed irregularities are directed away from the path of nozzle 36. In some embodiments, a surface roughener 50 (e.g., a machined carbide insert) may be formed within or otherwise connected to a lower portion of blade 46 and function to further prepare the exposed surface of structure 14 for deposition of a new ribbon of composite material. It is contemplated that a vacuum and/or pressurized gas (not shown) could be used to remove debris generated by blade 46 and/or surface roughener 50, if desired. In some embodiments, blade 46 may be pivotal in a travel direction of head 18 to reduce hang-ups between blade 46 and structure 14. It is also contemplated that the arrangement of vibration mechanisms 26 shown in FIG. 5 could be altered (e.g., reversed or rearranged to both occur on the same side of nozzle 36), such that blade 46 and/or roughener 50 are dressing the ribbon immediately after discharge, if desired.

INDUSTRIAL APPLICABILITY

The disclosed systems may be used to continuously manufacture composite structures having any desired cross-sectional shape, length, density, and/or strength. The composite structures may include any number of different reinforcements of the same or different types, diameters, shapes, configurations, and consists, and/or any number of different matrices. In addition, the disclosed systems may benefit from enhanced strength and/or quality compared to traditional systems. Operation of systems 10 and 12 will now be described in detail.

At a start of a manufacturing event, information regarding a desired structure 14 may be loaded into systems 10 and 12 (e.g., into controller 24 that is responsible for regulating operations of support 16, head 18, and/or cure enhancer(s) 20). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), location-specific matrix stipulations, location-specific reinforcement stipulations, surface dressing stipulations, compaction requirements, etc. It should be noted that this information may alternatively or additionally be loaded into systems 10 and 12 at different times and/or continuously during the manufacturing event, if desired.

Based on the component information, one or more different reinforcements and/or matrix materials may be selectively installed and/or continuously supplied into systems 10 and 12. In some embodiments, the reinforcements may also need to be connected to a pulling machine (not shown) and/or to a mounting fixture (e.g., to anchor point 22). Installation of the matrix material may include filling head 18 and/or coupling of an extruder (not shown) to head 18. Head 18 may then be moved by support 16 under the regulation of controller 24 to cause matrix-coated reinforcements to be placed against or on a corresponding anchor point 22. Cure enhancers 20 may then be selectively activated to cause hardening of the matrix material surrounding the reinforcements, thereby bonding the reinforcements to anchor point 22.

The component information may then be used to control operation of systems 10 and 12. For example, the reinforcements may be pulled and/or pushed from head 18 (along with the matrix material), while support 16 selectively moves head 18 in a desired manner, such that an axis of the resulting structure 14 follows a desired trajectory (e.g., a free-space, unsupported, 3-D trajectory). It should be noted that vibration mechanism(s) 26 may also be selectively activated at this time, such that a corresponding amount of vibrational energy is directed into head 18 at a desired location and/or into the material passing through head 18. As described above, this vibrational energy may help to improve fiber-to-fiber adhesion, to maintain nozzle 36 clear of castoff resin (i.e., to inhibit matrix buildup at a tip of nozzle 36), to enhance fiber impregnation (i.e., wetting of the reinforcements), and/or to improve settling of the resin. In addition, the vibrational energy may cause nozzle 36 to vibrate up-and-down, to shift side-to-side, to move primarily in one direction, to hop, to jump, to zigzag, etc. Once structure 14 has grown to a desired length, structure 14 may be disconnected (e.g., severed) from head 18 in any desired manner.

It will be apparent to those skilled in the art that various modifications and variations can be made to the disclosed systems and head. Other embodiments will be apparent to those skilled in the art from consideration of the specification and practice of the disclosed systems and heads. For example, it may be possible for vibration mechanism(s) 26 to additionally be used to mix the matrix in reservoir 34 (e.g., with chopped or flaked fibers, with a catalyst or hardener, etc.). It is intended that the specification and examples be considered as exemplary only, with a true scope being indicated by the following claims and their equivalents.

What is claimed is:

1. An additive manufacturing system, comprising:
   a nozzle configured to discharge a composite material, including a matrix and a continuous reinforcement;
   a support configured to move the nozzle in multiple dimensions during discharge of the composite material; and
   a vibration mechanism configured to generate oscillations that compacts the composite material after discharge from the nozzle,
   wherein the vibration mechanism includes:
      a shoe located at a side of the nozzle;
      a spring configured to bias the shoe against the composite material; and
      an actuator configured to cause the shoe to oscillate in an axial direction of the nozzle.

2. The additive manufacturing system of claim 1, further including a cure enhancer configured to direct energy to the composite material during discharge to enhance curing of the matrix.

3. The additive manufacturing system of claim 2, further including a reservoir configured to contain the matrix, wherein:
   the nozzle is configured to receive the matrix from the reservoir; and
   the vibration mechanism is connected to at least one of the reservoir and the nozzle.

4. The additive manufacturing system of claim 3, further including a dampener disposed between the cure enhancer and the at least one of the reservoir and the nozzle.

5. The additive manufacturing system of claim 3, further including:
   a housing configured to at least partially enclose the reservoir and the nozzle; and
   a dampener disposed between the housing and the at least one of the reservoir and the nozzle.

6. The additive manufacturing system of claim 3, wherein the vibration mechanism includes at least one of an imbalanced rotary actuator and a spring-biased linear actuator.

7. The additive manufacturing system of claim 6, further including a controller configured to:
   receive information regarding a structure to be manufactured with the composite material; and
   coordinate operation of the vibration mechanism with movement of the nozzle based on the information.

8. The additive manufacturing system of claim 1, wherein:
   the vibration mechanism is a first vibration mechanism; and the additive manufacturing system further includes a second vibration mechanism operatively connected at side of the nozzle opposite the first vibration mechanism.

9. The additive manufacturing system of claim 8, wherein the second vibration mechanism includes:
   a blade;
   a spring that biases the blade in an axial direction of the nozzle; and
   an actuator configured to cause the blade to oscillate in a direction normal to the axial direction of the nozzle.

10. The additive manufacturing system of claim 9, further including a roughener connected to a surface of the blade and configured to engage the composite material.

11. The additive manufacturing system of claim 9, wherein the blade is configured to pivot in a travel direction of the nozzle.

12. The additive manufacturing system of claim 9, wherein the first vibration mechanism oscillates at a frequency that is about 200 to 250 times an oscillation frequency of the second vibration mechanism.

13. The additive manufacturing system of claim 8, wherein:
   the first vibration mechanism is located at a trailing side of the nozzle relative to a travel direction of the nozzle; and
   the second vibration mechanism is located at a leading side of the nozzle.

14. An additive manufacturing system, comprising:
   a nozzle configured to discharge a composite material, including a matrix and a continuous reinforcement;
   a support configured to move the nozzle in multiple dimensions during discharge of the composite material; and
   a vibration mechanism configured to generate oscillations within the nozzle during discharge, wherein:
   the vibration mechanism is a first vibration mechanism;
   the additive manufacturing system further includes:
      a second vibration mechanism operatively connected to the nozzle; and
      a controller in communication with the first and second vibration mechanisms; and
   the controller is configured to cooperatively energize the first and second vibration mechanisms to produce a desired movement of the nozzle.

15. An additive manufacturing system, comprising:
   a nozzle configured to discharge a composite material, including a matrix and a continuous reinforcement;
   a support configured to move the nozzle in multiple dimensions during discharging;
   a cure enhancer configured to direct energy to the composite material during discharging to enhance curing of the matrix;
   a shoe connected to the nozzle at a trailing side relative to a travel direction of the nozzle;
   a first spring configured to bias the shoe against the composite material discharging from the nozzle;
   a first actuator configured to generate oscillations in the shoe in an axial direction of the nozzle;
   a blade connected to the nozzle at a leading side;
   a second spring configured to bias the blade in the axial direction of the nozzle; and
   a second actuator configured to generate oscillations in the blade in a direction normal to the axial direction of the nozzle.

16. The additive manufacturing system of claim 15, further including a roughener connected to a surface of the blade and configured to engage composite material.

17. The additive manufacturing system of claim 15, wherein the shoe oscillates at a frequency that is about 200 to 250 times an oscillation frequency of the blade.

* * * * *